(12) United States Patent
Lee et al.

(10) Patent No.: US 12,719,113 B2
(45) Date of Patent: Aug. 25, 2026

(54) METHOD OF EVALUATING INSULATION OF OVERLAY PART

(71) Applicant: LG ENERGY SOLUTION, LTD., Seoul (KR)

(72) Inventors: Byung Yong Lee, Daejeon (KR); Ung Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 903 days.

(21) Appl. No.: 17/910,991

(22) PCT Filed: Nov. 16, 2021

(86) PCT No.: PCT/KR2021/016740

§ 371 (c)(1), (2) Date: Sep. 12, 2022

(87) PCT Pub. No.: WO2022/108295

PCT Pub. Date: May 27, 2022

(65) Prior Publication Data

US 2023/0138500 A1 May 4, 2023

(30) Foreign Application Priority Data

Nov. 17, 2020 (KR) ........................ 10-2020-0153807

(51) Int. Cl.

*H01M 50/109* (2021.01)
*H01M 50/126* (2021.01)
*H01M 50/133* (2021.01)

(52) U.S. Cl.

CPC ....... *H01M 50/109* (2021.01); *H01M 50/126* (2021.01); *H01M 50/133* (2021.01)

(58) Field of Classification Search

CPC . H01M 50/109; H01M 50/126; H01M 50/133
See application file for complete search history.

(56) References Cited

U.S. PATENT DOCUMENTS

2004/0202928 A1 10/2004 Miyamoto et al.
2009/0317713 A1 12/2009 Kim et al.

(Continued)

FOREIGN PATENT DOCUMENTS

CN 104769754 A 7/2015
CN 107004890 A 8/2017

(Continued)

OTHER PUBLICATIONS

English Machine Translation of Lee et al. KR 20160091732 A (Year: 2016).*

(Continued)

*Primary Examiner* — Brian R Ohara
*Assistant Examiner* — Emily Elizabeth Freeman
(74) *Attorney, Agent, or Firm* — Morgan, Lewis & Bockius LLP

(57) ABSTRACT

A method for evaluating insulation includes applying and drying an insulation coating liquid on a simulated overlay part, and collecting first data about a first length of a first gap of a first applicator, a first thickness which has been increased by the insulation coating liquid, and a capacity of the simulated overlay part; applying and drying the insulation coating liquid on a current collector for a simulated pure insulation coating layer, and collecting second data about a second length of a second gap of a second applicator and a second thickness of the pure insulation coating layer; generating a relation between the second thickness and the capacity; measuring a thickness of a pure insulation coating layer of an electrode for evaluation; and determining a capacity of an overlay part of the electrode for evaluation from the measured thickness using the generated relation.

11 Claims, 8 Drawing Sheets

(56) References Cited

U.S. PATENT DOCUMENTS

| | | | | |
|---|---|---|---|---|
| 2014/0255778 | A1 | 9/2014 | Huh et al. | |
| 2015/0010460 | A1* | 1/2015 | Takeuchi | H01M 4/587 423/449.6 |
| 2015/0243964 | A1 | 8/2015 | Yu et al. | |
| 2017/0373338 | A1 | 12/2017 | Teranishi et al. | |
| 2018/0277881 | A1* | 9/2018 | Nakamura | H01M 10/058 |
| 2018/0345310 | A1 | 12/2018 | Watanabe et al. | |
| 2019/0393478 | A1* | 12/2019 | Basu | H01M 4/139 |
| 2020/0212444 | A1 | 7/2020 | Lee et al. | |
| 2021/0066705 | A1* | 3/2021 | Yamada | H01M 4/525 |
| 2021/0265609 | A1* | 8/2021 | Toyoshima | H01M 4/364 |
| 2021/0336248 | A1* | 10/2021 | Morisaki | C04B 35/6261 |

FOREIGN PATENT DOCUMENTS

| | | | |
|---|---|---|---|
| JP | 2013-127091 | A | 8/2013 |
| JP | 2017-212097 | A | 11/2017 |
| JP | 2018-004336 | A | 1/2018 |
| JP | 2018-045952 | A | 3/2018 |
| JP | 6307594 | B2 | 4/2018 |
| KR | 2004-0076831 | A | 9/2004 |
| KR | 2009-0132500 | A | 12/2009 |
| KR | 10-1586530 | B1 | 1/2016 |
| KR | 10-2016-0091732 | A | 8/2016 |
| KR | 10-1768195 | B1 | 8/2017 |
| KR | 2017-0126463 | A | 11/2017 |
| KR | 2017-0139463 | A | 12/2017 |
| KR | 2019-0083625 | A | 7/2019 |

OTHER PUBLICATIONS

Extended European Search Report issued Apr. 12, 2024 for European Patent Application No. 21895063.2.

Office Action dated Dec. 16, 2024 issued in Chinese Patent Application No. 202180021276.6.

International Search Report for corresponding International Patent Application No. PCT/KR2021/016740.

* cited by examiner

【FIG. 1】
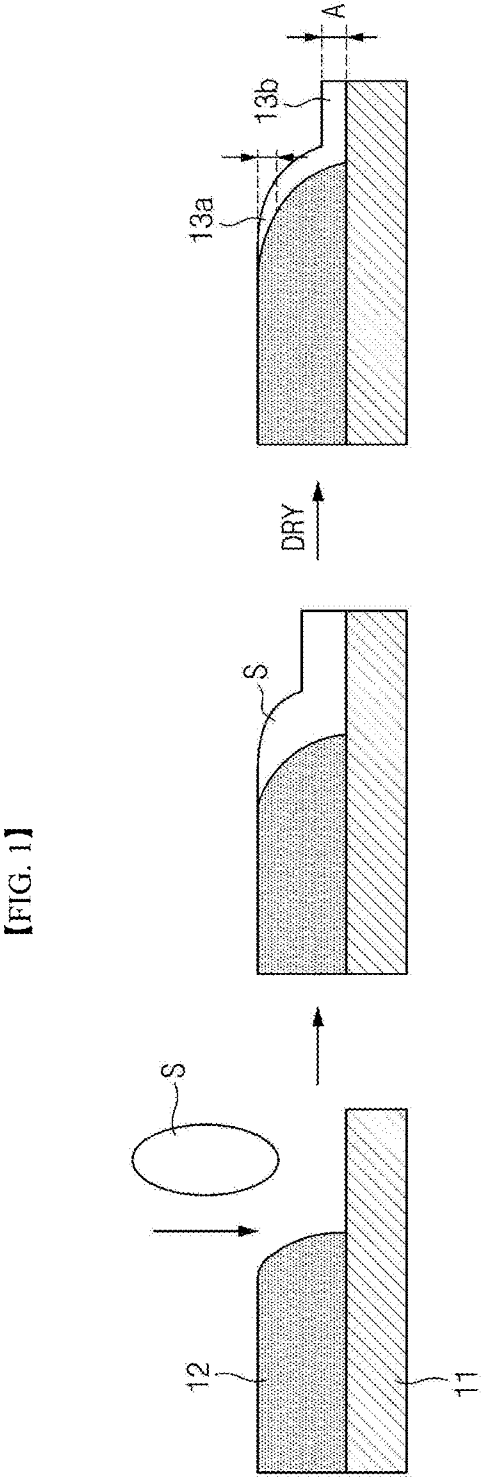

【FIG. 2】
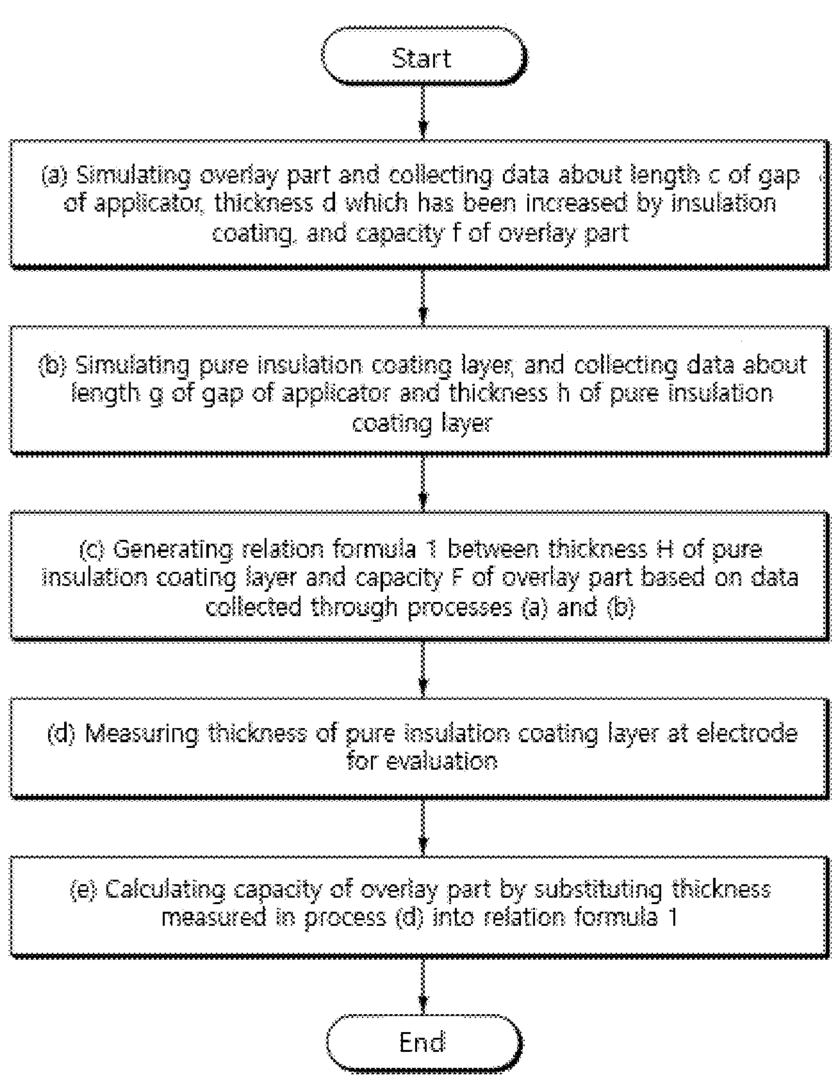

【FIG. 3】
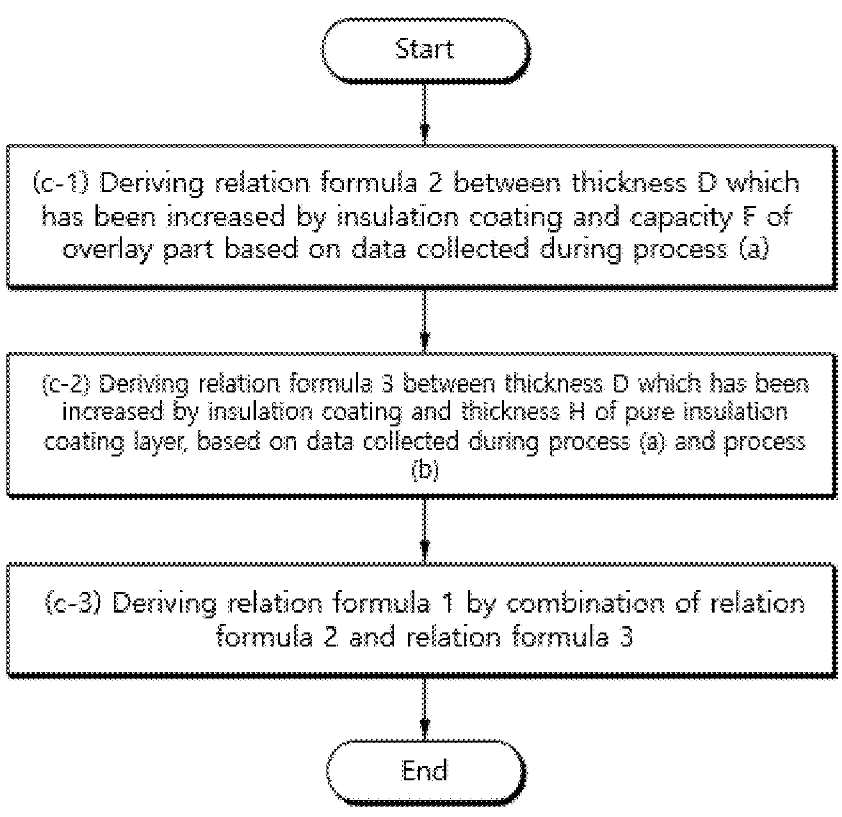

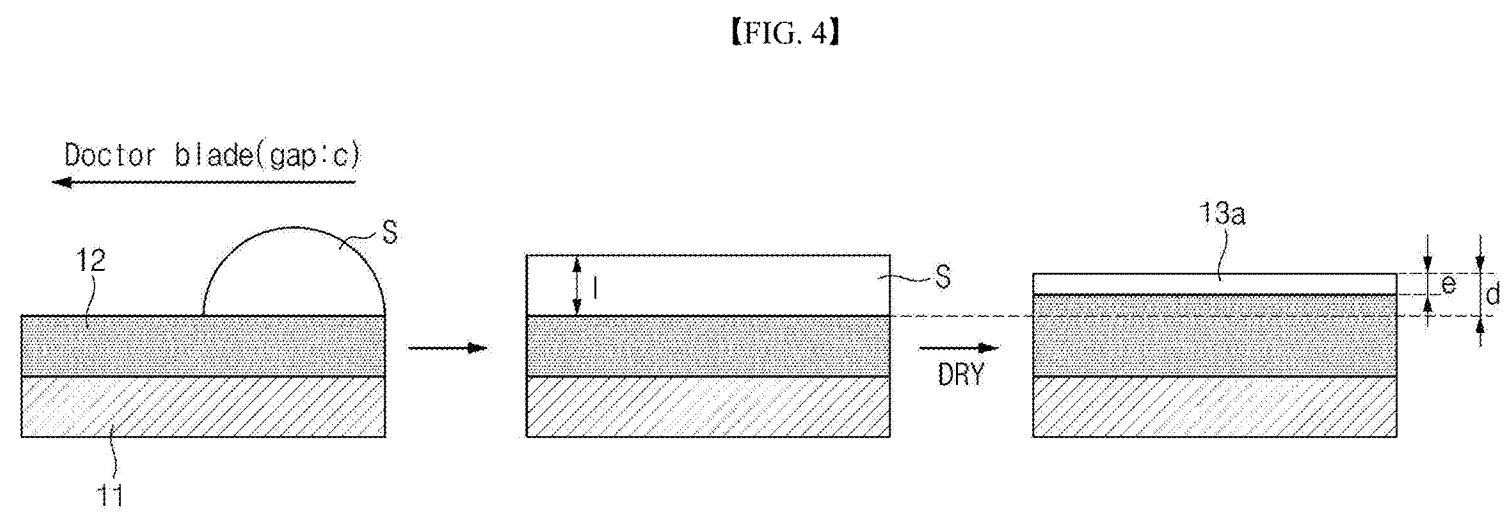

【FIG. 4】

【FIG. 5】
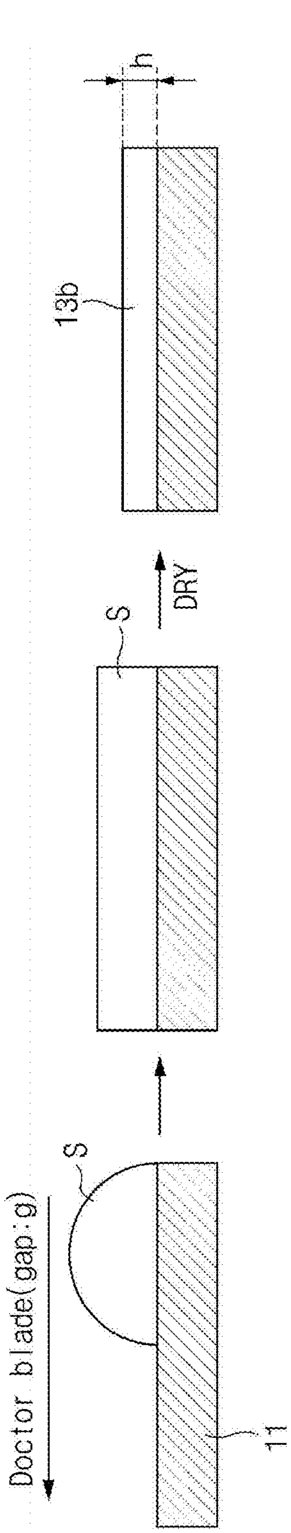

【FIG. 6】
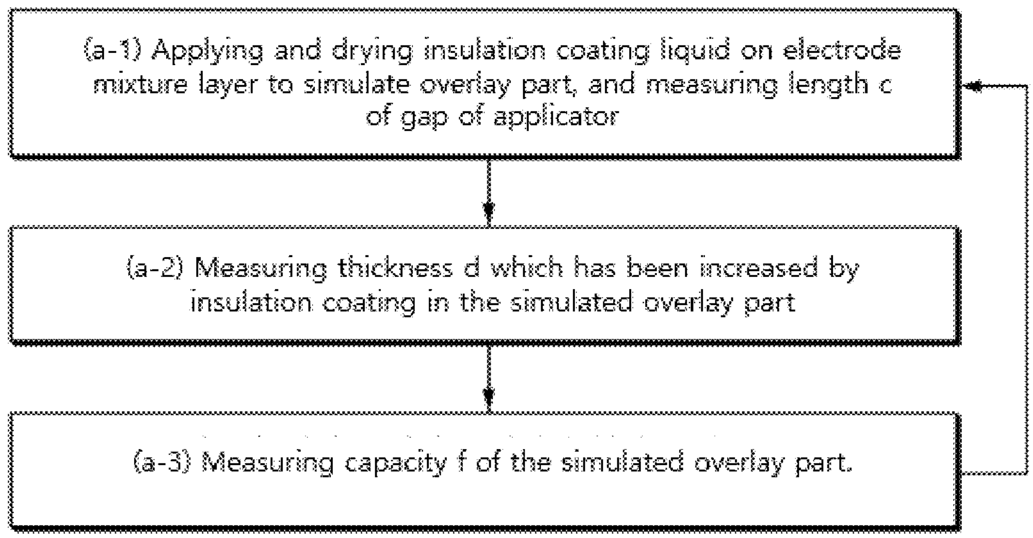
【FIG. 7】
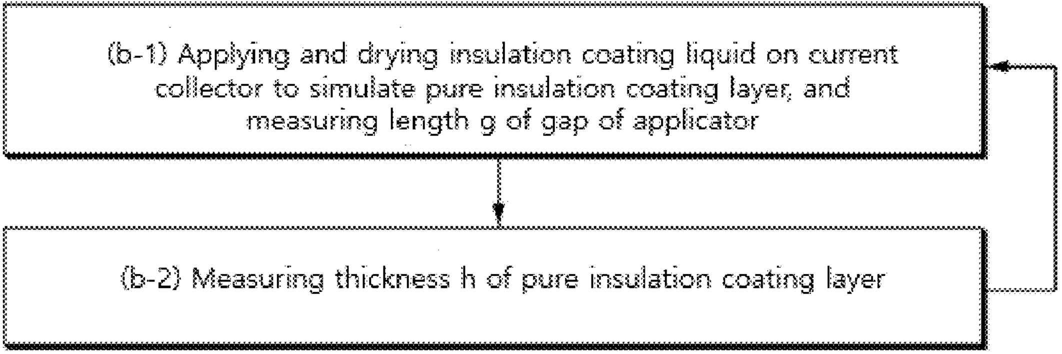

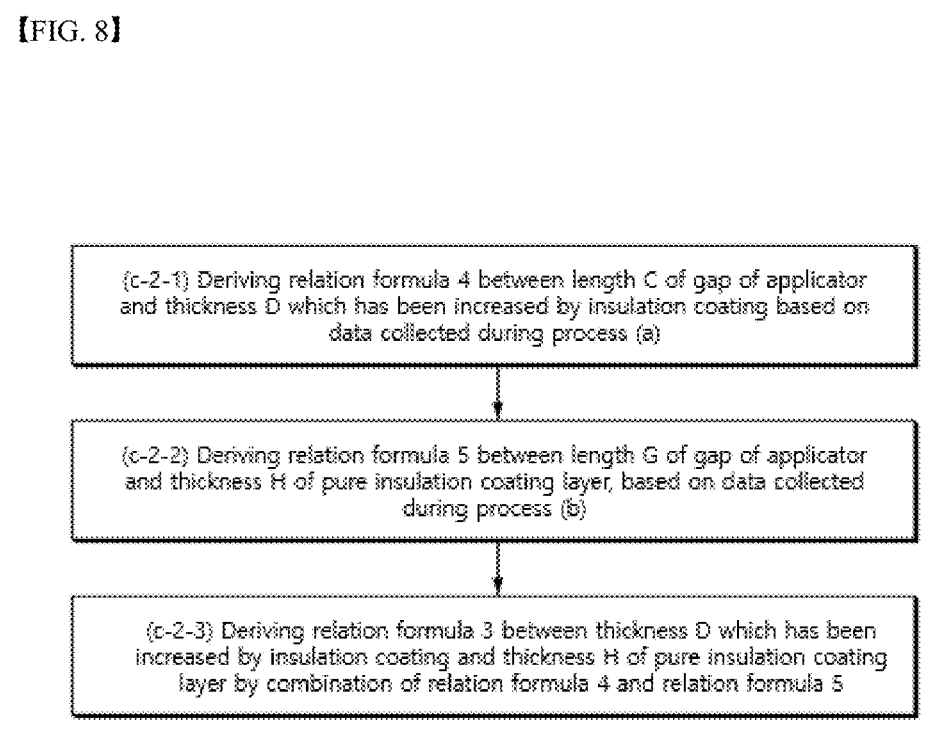

【FIG. 8】

(c-2-1) Deriving relation formula 4 between length C of gap of applicator and thickness D which has been increased by insulation coating based on data collected during process (a)

↓

(c-2-2) Deriving relation formula 5 between length G of gap of applicator and thickness H of pure insulation coating layer, based on data collected during process (b)

↓

(c-2-3) Deriving relation formula 3 between thickness D which has been increased by insulation coating and thickness H of pure insulation coating layer by combination of relation formula 4 and relation formula 5

【FIG. 9】
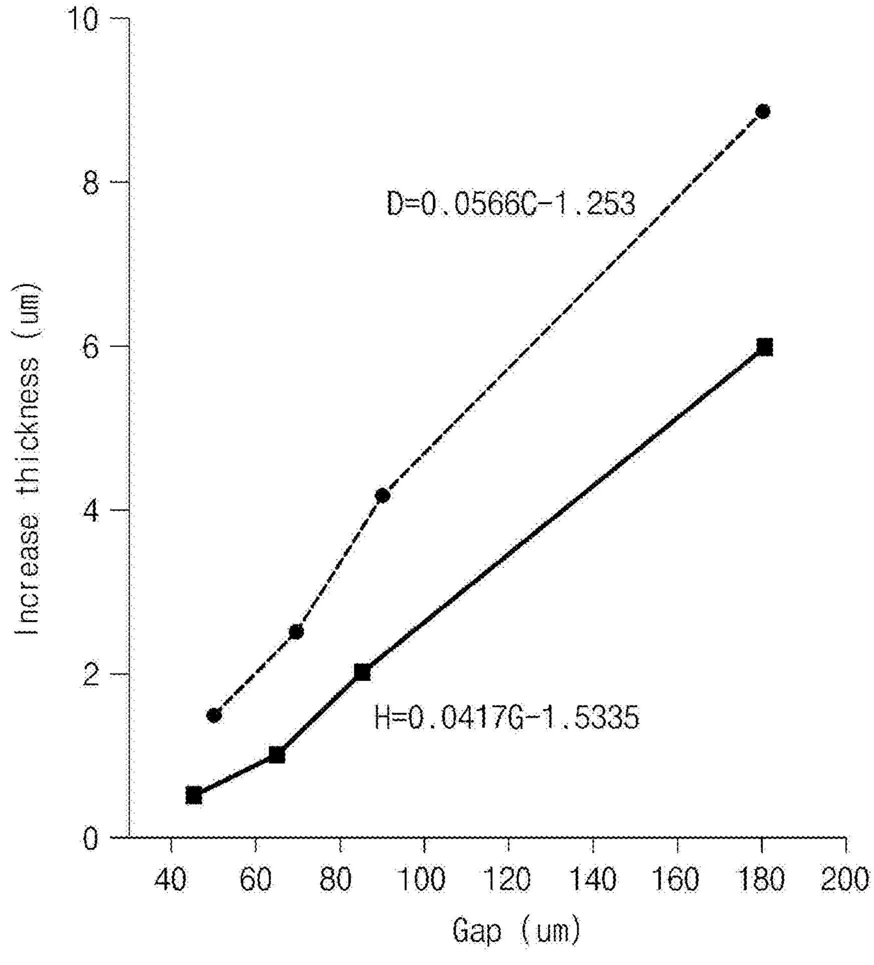

METHOD OF EVALUATING INSULATION OF OVERLAY PART

TECHNICAL FIELD

This application claims the benefit of priority based on Korean Patent Application No. 10-2020-0153807, filed on Nov. 17, 2020, and the entire contents of the Korean patent application are incorporated herein by reference.

The present invention relates to a method of evaluating insulation of an insulation coating layer, and specifically to a method of evaluating insulation of an overlay part without measuring the thickness of an insulation coating layer in an overlay part where the insulation coating layer has been laminated on an electrode mixture layer.

BACKGROUND ART

As technology development and demand for mobile devices increase, the demand for batteries as an energy source is rapidly increasing, and among such secondary batteries, many studies have been conducted on lithium secondary batteries having a high energy density and a discharge voltage, and have been commercialized and widely used.

When such a lithium secondary battery is exposed to a high temperature, there is a possibility that a short circuit occurs due to a contact between the positive electrode and the negative electrode. Further, even when a large electric current flows within a short period of time by overcharge, an external short circuit, nail penetration, a local crush, etc., there is a danger of ignition/explosion as the battery is heated by heat generation.

Such a phenomenon usually occurs at the end of the electrode active material applied on the electrode current collector at the time of electrode lamination, and various methods to reduce the possibility of a short circuit of an electrode at an external shock or high temperature have been tried.

FIG. 1 shows a process of applying insulation coating liquid on the end of a positive electrode mixture coated portion in order to prevent a short circuit of a positive electrode and a negative electrode. Referring to FIG. 1, an electrode mixture layer 12 is formed by coating an electrode slurry including an electrode active material on an electrode current collector 11, and insulation coating liquid is applied on the non-coated part around the end of the electrode mixture layer 12 and is dried to thereby form insulation coating layers 13*a* and 13*b*. Since the electrode mixture layer before being dried has fluidity, a sliding phenomenon, in which the thickness of the end gradually decreases, is shown. Further, since the insulation coating liquid is fluid, the insulation coating liquid is coated not only on the non-coated part, but also on the sliding portion of the electrode mixture layer. Hence, the finally formed insulation coating layer includes a pure insulation coating layer 13*b* formed on the non-coated part and an overlay part insulation coating layer 13*a* formed on the electrode mixture layer.

In the electrode as shown in FIG. 1, the pure insulation coating layer blocks movement of electrons to thereby prevent a short circuit of the positive electrode and the negative electrode, and the overlay part insulation coating layer limits the movement of lithium ions to a non-existing place to thereby further improve safety of the battery.

Further, since the insulation of the insulation coating layer is proportional to the thickness of the insulation coating layer, the insulating performance is managed by measuring the thickness of the insulation coating layer. In an electrode having an overlay part, the thickness of the coated pure insulation coating layer 13*b* can be easily measured, but in order to separately measure the thickness of the insulation coating layer 13*a* of the overlay part, new equipment should be introduced, which may take a lot of time and costs. Further, in the insulation coating layer of the overlay part, part of the insulation coating liquid is permeated into pores of the electrode mixture layer unlike the pure insulation coating layer, and accordingly, the insulating performance of the overlay part is shown by the action of both the insulating material of the insulation coating layer and the insulating material permeated into the electrode mixture layer. Hence, it is difficult to evaluate insulation by measuring the thickness of the insulation coating layer of the overlay part.

As such, there is a need for a technology for predicting insulation of an overlay part using conventional management factors without introducing new equipment.

DISCLOSURE

Technical Problem

The present invention is believed to solve at least some of the above problems. For example, an aspect of the present invention provides a method of evaluating insulation of an insulation coating layer in an overlay part without introduction of new equipment.

Technical Solution

A method of evaluating insulation of the present invention for solving the above problems includes:

(a) a process of applying and drying insulation coating liquid on the electrode mixture layer to thereby simulate the overlay part, and collecting data about a length c of a gap of an applicator, a thickness d which has been increased by insulation coating, and a capacity f of the overlay part;

(b) a process of applying and drying insulation coating liquid on a current collector to thereby simulate a pure insulation coating layer, and collecting data about a length g of a gap of an applicator and a thickness h of the pure insulation coating layer;

(c) a process of generating a relation formula 1 between thickness H of the pure insulation coating layer and capacity F of the overlay part based on data collected through the processes (a) and (b);

(d) a process of measuring a thickness of a pure insulation coating layer at an electrode for evaluation; and (e) a process of calculating the capacity of the overlay part by substituting the thickness of the pure insulation coating layer measured in the process (d) into the relation formula 1.

In one specific example, the process (c) includes:

(c-1) a process of deriving relation formula 2 between thickness D which has been increased by insulation coating and capacity F of the overlay part based on data about the capacity f of the overlay part according to the thickness d which has been increased by insulation coating, which has been collected during the process (a);

(c-2) a process of deriving relation formula 3 between the thickness D which has been increased by insulation coating and the thickness H of the pure insulation coating layer, based on data about the length c of the gap of the applicator and the thickness d which has been increased by insulation coating, collected during the process (a), and data about the length g of the gap of the applicator and the thickness h of the pure insulation coating layer, collected during the process (b); and (c-3) a process of deriving the relation formula 1 by combination of the relation formula 2 and the relation formula 3.

In one specific example, the process (a) includes:

(a-1) a process of applying and drying insulation coating liquid on the electrode mixture layer to thereby simulate the overlay part, and measuring a length c of the gap of the applicator which applies the insulation coating liquid;

(a-2) a process of measuring the thickness d which has been increased by insulation coating in the simulated overlay part; and (a-3) a process of measuring capacity f of the simulated overlay part.

Herein, data about the length c of the gap of the applicator, the thickness d which has been increased by insulation coating, and the capacity f of the overlay part is collected by repeating the processes (a-1) to (a-3).

In one specific example, the process (b) includes:

(b-1) a process of applying and drying insulation coating liquid on the current collector to thereby simulate the pure insulation coating layer, and measuring a length g of the gap of the applicator which applies the insulation coating liquid; and (b-2) a process of measuring thickness h of the pure insulation coating layer simulated by the process (b-1).

Herein, data about the length g of the gap of the applicator which applies the insulation coating liquid, and the thickness h of the pure insulation coating layer is collected by repeating the processes (b-1) to (b-2).

In one specific example, the process (c-2) includes:

(c-2-1) a process of deriving relation formula 4 between length C of the gap of the applicator and thickness D which has been increased by insulation coating based on data about the length c of the gap of the applicator and the thickness d which has been increased by insulation coating, collected during the process (a);

(c-2-2) a process of deriving relation formula 5 between length G of the gap of the applicator and thickness H of the pure insulation coating layer, based on data about the length g of the gap of the applicator and the thickness h of the pure insulation coating layer, collected during the process (b); and (c-2-3) a process of deriving relation formula 3 between thickness D which has been increased by insulation coating and thickness H of the pure insulation coating layer by eliminating a gap of the applicator, which is a parameter, by combination of the relation formula 4 and the relation formula 5.

In one specific example, the process (a-3) includes a process of manufacturing a coin cell including the simulated overlay part, and measuring capacity f of the overlay part by measuring a charge capacity or a discharge capacity of the coin cell, and the coin cell may be a half cell.

In one specific example, part of the insulation coating liquid applied on the electrode mixture layer is permeated into the electrode mixture layer during the simulating of the overlay part of the process (a).

In one specific example, the thickness d which has been increased by insulation coating is obtained by subtracting a thickness of the electrode mixture layer before application of the insulation coating liquid from a total thickness of the electrode mixture layer and the insulation coating layer after drying the insulation coating liquid.

In one specific example, the insulation coating layer includes polyvinylidene fluoride (PVDF).

In one specific example, the electrode is a positive electrode.

In one specific example, the thickness of the pure insulation coating layer is equal to or less than 15 μm.

Advantageous Effects

According to the present invention, it is possible to evaluate the insulation of the overlay part by measuring the thickness of the pure insulation coating layer of which the thickness can be easily measured, and the insulation evaluation result is also relatively accurate by reflecting the insulating performance by insulating materials permeated into the electrode mixture layer in the overlay part.

BRIEF DESCRIPTION OF THE DRAWINGS

FIG. 1 is a schematic diagram showing a process of applying an insulation coating liquid to the end of a positive electrode mixture coated portion.

FIG. 2 is a flowchart illustrating the flow of a method of evaluating insulation of an overlay part according to an embodiment of the present invention.

FIG. 3 is a flowchart illustrating a process of deriving relation formula 1 of process (c) according to an embodiment of the present invention.

FIG. 4 is a schematic diagram illustrating a process of process (a) of simulating an overlay part and collecting data according to an embodiment of the present invention.

FIG. 5 is a schematic diagram illustrating a process of process (b) of simulating a pure insulation coating layer and collecting data according to an embodiment of the present invention.

FIG. 6 is a flowchart illustrating a detailed process of process (a) according to an embodiment of the present invention.

FIG. 7 is a flowchart illustrating a detailed process of process (b) according to an embodiment of the present invention.

FIG. 8 is a flowchart illustrating a detailed process for deriving relation formula 3 of process (c-2) according to an embodiment of the present invention.

FIG. 9 is a graph showing relation formula 4 and relation formula 5 according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Further, in the present invention, the overlay part means a partial electrode portion where an insulation coating layer has been formed on an electrode mixture layer in an electrode including an insulation coating layer.

Hereinafter, the present invention will be described in detail with reference to the drawings.

The present invention relates to a method of evaluating insulation in an overlay part where an insulation coating layer has been laminated on a sliding portion of an electrode mixture layer, and more specifically to a new method of evaluating insulation in an overlay part by measuring the thickness of an insulation coating layer coated on a non-coated part (hereinafter, referred to as "pure insulation coating layer") because it is difficult to measure the thickness of the insulation coating layer in the overlay part.

In the specification of the present invention, the sliding portion has a concept of including an inclined region of the end of the electrode mixture layer, and its periphery, which are formed by fluidity of the electrode slurry.

In the present invention, there is no limitation to the type of the insulating material included in the insulation coating liquid for forming an insulation coating layer as long as it exhibits insulating effects. The insulating material may be at least one selected from the group consisting of polybutadiene, polyurethane, polyimide, acetate, polyester, polyphenylene sulfide (PPS), polyphenylene, styrene-butadiene-based copolymer, (meta)acrylic acid copolymer, (meta) acrylate copolymer, polyacrylonitrile, polyvinyl chloride, polyfluoro compound, polyvinyl alcohol, and polycyanoacrylate. In the example of the present invention, polyvinylidene fluoride (PVDF) included in the insulating material.

The insulation coating layer may be formed on the regions including from the end of the electrode mixture layer to the active material non-coated part and may be formed to have a thickness equal to or less than 15 μm and specifically in the range of 2 to 15 μm. When the thickness of the insulation coating layer is less than 2 μm, the effects of preventing deintercalation of active materials or suppressing the movement of lithium ions become insignificant, and when the thickness of the insulation coating layer exceeds 15 μm, a crack may be generated on the active material layer due to a step difference of the thickness.

The insulation coating layer generally forms a positive electrode, and the method of evaluating insulation of the present invention may be applied to a positive electrode.

FIG. 2 is a flowchart illustrating the flow of a method of evaluating insulation of an overlay part according to an embodiment of the present invention. Referring to FIG. 2, a method for evaluating insulation of an overlay part according to the present invention includes: (a) a process of applying and drying insulation coating liquid on the electrode mixture layer to thereby simulate the overlay part, and collecting data about a length c of a gap of an applicator, a thickness d which has been increased by insulation coating, and a capacity f of the overlay part;

(b) a process of applying and drying insulation coating liquid on a current collector to thereby simulate a pure insulation coating layer, and collecting data about a length g of a gap of an applicator and a thickness h of the pure insulation coating layer;

(c) a process of generating a relation formula 1 between thickness H of the pure insulation coating layer and capacity F of the overlay part based on data collected through the processes (a) and (b);

(d) a process of measuring a thickness of a pure insulation coating layer at an electrode for evaluation; and (e) a process of calculating the capacity of the overlay part by substituting the thickness of the pure insulation coating layer measured in the process (d) into the relation formula 1.

Likewise, according to the present invention, it is possible to evaluate insulation of the overlay part by measuring the thickness of the pure insulation coating layer and substituting the thickness of the measured pure insulation coating layer into relation formula 1. Hence, introduction of new equipment is not necessary in order to measure the thickness of the insulation coating layer in the overlay part, and there is no error at the time of measuring the thickness of the insulation coating layer in the overlay part.

Hereinafter, the process of deriving the relation formula 1 will be described in detail. FIG. 3 is a flowchart illustrating a process of deriving relation formula 1 of process (c) according to an embodiment of the present invention. Referring to FIG. 3, the process of deriving relation formula 1 includes:

(c-1) a process of deriving relation formula 2 between thickness D which has been increased by insulation coating and capacity F of the overlay part based on data about the capacity f of the overlay part according to the thickness d which has been increased by insulation coating, which has been collected during the process (a);

(c-2) a process of deriving relation formula 3 between the thickness D which has been increased by insulation coating and the thickness H of the pure insulation coating layer, based on data about the length c of the gap of the applicator and the thickness d which has been increased by insulation coating, collected during the process (a), and data about the length g of the gap of the applicator and the thickness h of the pure insulation coating layer, collected during the process (b); and (c-3) a process of deriving the relation formula 1 by combination of the relation formula 2 and the relation formula 3.

In the present invention, in order to derive relation formula 2 between the thickness D which has been increased by insulation coating in the overlay part and the capacity F of the overlay part, and relation formula 3 between the thickness D which has been increased by insulation coating in the overlay part and the thickness H of the pure insulation coating layer, the overlay part simulation process of the process (a) and the pure insulation coating layer simulation process of the process (b) are performed, and data, which are necessary to derive the relation formula 2 and relation formula 3, is collected through the two simulation processes.

Hereinafter, the process of deriving the relation formula 2 and relation formula 3 through two simulation processes will be described.

In the present invention, in order to evaluate insulation in the overlay part, the thickness of the insulation coating layer is not measured, and the insulation in the overlay part is evaluated by measuring the thickness of the pure insulation coating layer. As such, in the present invention, two simulation processes of simulating the overlay part and simulating the pure insulation coating layer are performed. Hence, the process (a) of simulating the overlay part will be described, and the process (b) of simulating the pure insulation coating layer will then be described.

<Process (a) of simulating overlay part and collecting data>

FIG. 4 is a schematic diagram illustrating a process of simulating the overlay part of the process (a). Referring to FIG. 4, an electrode slurry including the electrode active material is coated on the current collector 11, and insulation coating liquid S is then coated on the electrode mixture layer 12. At this time, the gap c of the applicator, which applies the insulation coating liquid, is measured, and the measurement values are saved as $c_1$, $c_2$, $C_3$, $C_4$ . . . $C_n$. Thereafter, if the drying process is performed, the overlay part is simulated as an insulation coating layer 13*a* is formed on the electrode mixture layer.

As described above, in the overlay part of the electrode, part of the elements of the insulation coating liquid are permeated into pores of the electrode mixture layer. As such, the insulation of the overlay part is shown by the insulation coating liquid permeated into the electrode mixture layer, too. Hence, in order to guarantee the reliability, data, which is obtained by simulating the overlay part, is necessary.

Referring to FIG. 4, the coating thickness of the insulation coating liquid before the drying process is I and the thickness decreases and becomes e after the drying process. This occurs as the solvent of the insulation coating liquid is removed and part of the insulation coating liquid elements is permeated into pores of the electrode mixture layer. As such, the insulation in the overlay part is shown by the insulation coating liquid elements existing in the electrode mixture layer together with the insulation coating layer which is distinguished with the naked eye.

Referring to FIG. 4, after applying and drying the insulation coating liquid, the thickness of the electrode mixture layer slightly increases, which is due to the insulation coating elements existing in the electrode mixture layer. Hence, in the present invention, in the simulated overlay part, after the drying of the insulation coating liquid, both the increase in the thickness of the electrode mixture layer and the thickness e of the final insulation coating layer show insulation, and accordingly, the process of collecting data about the thickness d which has been increased by insulation coating is included.

The thickness d which has been increased by insulation coating is obtained by subtracting a thickness of the electrode mixture layer before application of the insulation coating liquid from a total thickness of the electrode mixture layer and the insulation coating layer after drying the insulation coating liquid.

Likewise, in the process (a) of the present invention, the overlay part is simulated, and the thickness d, which has been increased by insulation coating, is considered as a portion which shows insulation by insulation coating, and the process of measuring the thickness d and the capacity f of the overlay part is performed. The capacity f is measured to measure the insulation.

FIG. 6 is a flowchart illustrating a detailed process of process (a) according to an embodiment of the present invention. Referring to FIG. 6, the process (a) according to one embodiment of the present invention includes:

(a-1) a process of applying and drying insulation coating liquid on the electrode mixture layer to thereby simulate the overlay part, and measuring a length c of the gap of the applicator which applies the insulation coating liquid; (a-2) a process of measuring the thickness d which has been increased by insulation coating in the simulated overlay part; and (a-3) a process of measuring capacity f of the simulated overlay part.

Herein, data about the length c of the gap of the applicator, the thickness d which has been increased by insulation coating, and the capacity f of the overlay part is collected by repeating the processes (a-1) to (a-3).

In the process (a-1), data of $c_1$, $c_2$, $C_3$, $C_4$ . . . $C_n$ is collected by measuring the gap c of the applicator, and in the process (a-2), data of $d_1$, $d_2$, $d_3$, $d_4$ . . . $d_n$ is collected by measuring the thickness d which has been increased by insulation coating, and in the process (a-3), data of $f_1$, $f_2$, $f_3$, $f_4$ . . . $f_n$ is collected by measuring the capacity f of the overlay part.

In an embodiment of the present invention, the process (a-3) includes a process of manufacturing a coin cell including the simulated overlay part, and measuring capacity f of the overlay part by measuring a charge capacity or a discharge capacity of the coin cell. At this time, the coin cell may be a half cell.

The data, which is collected by repeating the processes (a-1) to (a-3), is used as reference data when generating relation formula 2 and relation formula 4.

<Process (b) of simulating pure insulation coating layer and collecting data>

FIG. 5 is a schematic diagram illustrating a process of simulating a pure insulation coating layer of process (b) and collecting data according to an embodiment of the present invention. Referring to FIG. 5, a pure insulation coating layer 13*b* is simulated by applying insulation coating liquid S on the current collector 11 and drying the insulation coating liquid S.

FIG. 7 is a flowchart illustrating a detailed process of process (b) according to an embodiment of the present invention. Referring to FIG. 7, the process (b) according to one embodiment of the present invention includes:

(b-1) a process of applying and drying insulation coating liquid on the current collector to thereby simulate the pure insulation coating layer, and measuring a length g of the gap of the applicator which applies the insulation coating liquid; and (b-2) a process of measuring thickness h of the pure insulation coating layer simulated by the process (b-1).

Herein, data about the length g of the gap of the applicator which applies the insulation coating liquid, and the thickness h of the pure insulation coating layer is collected by repeating the processes (b-1) to (b-2).

In the process (b-1), data of $g_1$, $g_2$, $g_3$, $g_4$ . . . $g_n$ is collected by measuring the length g of the gap of the applicator which applies insulation coating liquid, and in the process (b-2), data of $h_1$, $h_2$, $h_3$, $h_4$ . . . $h_n$, is collected by measuring the thickness h of the pure insulation coating layer corresponding to the g.

The data, which is collected by repeating the processes (b-1) to (b-2), is used as reference data when generating relation formula 5 to be described later.

<Process (c-1) of deriving relation formula 2>

The process (c-1) of the present invention is a process of deriving relation formula 2 between the thickness D which has been increased by insulation coating and the capacity F of the overlay part. This is generated based on the thickness d which has been increased by insulation coating and its corresponding capacity f of the overlay part, collected in the process (a). Namely, relation formula 2 is derived through the analysis on the correlation between the d and the capacity f corresponding thereto.

<Process (c-2) of deriving relation formula 3>

FIG. 8 is a flowchart illustrating a detailed process for deriving relation formula 3 of process (c-2) according to an embodiment of the present invention. Referring to FIG. 8, the process (c-2) of deriving relation formula 3 of the present invention includes:

(c-2-1) a process of deriving relation formula 4 between length C of the gap of the applicator and thickness D which has been increased by insulation coating based on data about the length c of the gap of the applicator and the thickness d which has been increased by insulation coating, collected during the process (a);

(c-2-2) a process of deriving relation formula 5 between length G of the gap of the applicator and thickness H of the pure insulation coating layer, based on data about the length g of the gap of the applicator and the thickness h of the pure insulation coating layer, collected during the process (b); and (c-2-3) a process of deriving relation formula 3 between thickness D which has been increased by insulation coating and thickness H of the pure insulation coating layer by eliminating a gap of the applicator, which is a parameter, by combination of the relation formula 4 and the relation formula 5.

The relation formula 4 of the (c-2-1) is generated from the data about the length c of the gap of the applicator, which is collected during the process (a), and the data about the thickness d, which has been increased by insulation coating, according thereto. Namely, relation formula 4 is derived through the analysis on the correlation between the c and the d corresponding thereto.

The relation formula 5 of the (c-2-2) is generated from the data about the length g of the gap of the applicator, which is collected during the process (b), and the data about the thickness d of the pure insulation coating layer according thereto. Namely, relation formula 5 is derived through the analysis on the correlation between the g and the h corresponding thereto.

The process of generating relation formula 3 of the (c-2-3) is a process of deriving relation formula 3 between thickness D which has been increased by insulation coating and thickness H of the pure insulation coating layer by combining the above-generated relation formula 4 and relation formula 5 and eliminating the length c and g of the gap of the applicator, which is the common parameter of these formulas.

<Process <c-3> of deriving relation formula 1>

The above-described relation formula 2 is a relation formula between the thickness D which has been increased by insulation coating and the capacity F of the overlay part, and the relation formula 3 is a relation formula between the thickness D which has been increased by insulation coating and the thickness H of the pure insulation coating layer. When combining these two formulas, the common parameter D can be eliminated. As such, relation formula 1 between the thickness H of the pure insulation coating layer and the capacity F of the overlay part is generated.

In the evaluation method of the present invention, when evaluating insulation of an overlay part in an electrode including an overlay part, the capacity F of the overlay part can be calculated by measuring the thickness of the pure insulation coating layer and substituting the measured thickness of the pure insulation coating layer into the relation formula 1, and the insulation can be evaluated through the capacity F. Hence, it is possible to easily evaluate the insulation of the overlay part, and the insulation evaluated like this can be guaranteed.

Hereinafter, embodiments of the present invention are described, but the following embodiments are used to illustrate the invention, and the category of the present invention is not limited to these alone.

Example: deriving relation formula 1

<Process (a) of simulating overlay part and collecting data>

A positive electrode slurry was manufactured by mixing a positive electrode active material, which contains nickel, manganese and chrome at the ratio of 7:1:2, carbon black as a conductive material, and SBR as a binder, at the weight ratio of 97:1.5 and 1.5, and dispersing the mixture in an NMP solvent. An electrode mixture layer was manufactured by applying the positive electrode slurry on an aluminum current collector and drying the positive electrode slurry. Thereafter, the simulation of the overlay part was completed by applying insulation coating liquid of 10 μm or less including PVDF and drying the insulation coating liquid at a temperature of 130° C. for 20 minutes.

At this time, data was collected by measuring the length c of the gap of the applicator which applies insulation coating liquid, the thickness d which has been increased by insulation coating corresponding thereto, and the capacity f of the overlay part, and then repeating the process while changing the c.

When measuring the capacity f, a coin-half cell was manufactured using the positive electrode including the simulated overlay part, and the counter electrode of lithium, and charge/discharge was performed, and discharge capacity f was then measured.

<Process (b) of simulating pure insulation coating layer and collecting data>

Insulation coating liquid was applied on an aluminum current collector while adjusting the length g of the gap of the applicator using the aluminum current collector and the insulation coating liquid which are the same as in the simulation of the overlay part, and the applied insulation coating liquid was dried at 130° C. for 20 minutes to thereby simulate a pure insulation coating layer.

At this time, data was collected by measuring the length g of the gap of the applicator which applies insulation coating liquid and the thickness h of the pure insulation coating layer, and then repeating the process while changing the g.

<Process (c-1) of deriving relation formula 2>

The relation formula 2 between the thickness D which has been increased by insulation coating, and the capacity F of the overlay part was generated from data d and f collected during the process (a), and the generated relation formula 2 is as follows.

The derived relation formula 2 is as follows.

[Relation formula 2]

$$F=0.37894-4.7*10^{26}*\exp(-68.984*D)-2.91*10^{2}*\exp(-1.21385*D)$$

<Process (c-2) of deriving relation formula 3>

The relation formula 3 was derived by performing the process (c-2-1) of deriving relation formula 4 between the gap C of the applicator and the thickness D which has been increased by insulation coating, and the process (c-2-2) of deriving the relation formula 5 between the length G of the gap of the applicator and the thickness H of the pure insulation coating layer.

The relation formula 4 is derived through the analysis of data c and d collected during the process (a), and the derived relation formula 4 is shown in FIG. 9 and is as follows.

[Relation formula 4]

$$D=0.0566C-1.2553$$

The relation formula 5 is derived through the analysis of data g and h collected during the process (b), and the derived relation formula 5 is shown in FIG. 9 and is as follows.

[Relation formula 5]

$$H=0.0417G-1.5335$$

The relation formula 3 between thickness D which has been increased by insulation coating and thickness H of the pure insulation coating layer is derived by the combination of the derived relation formula 4 and relation formula 5. Specifically, in the derived relation formula 4 (D=0.0566C-1.2553) and relation formula 5 (H=0.0417G-1.5335), both C and G are the length of the gap of the applicator of the insulation coating liquid. As such, the relation formula 3 between the thickness H of the pure insulation coating layer and the thickness D which has been increased by insulation coating is derived using C and G as parameters, and the relation formula 3 is as follows.

[Relation formula 3]

$$H=0.736749D-0.610353$$

<Process <c-3> of deriving relation formula 1>

The relation formula 1 between the thickness H of the pure insulation coating layer and the capacity F of the overlay part may be obtained by combination of the relation formula 3 and the relation formula 2. Specifically, the relation formula 1 is obtained as common parameter D is eliminated by combination of relation formula 3 and relation formula 2, and the relation formula 1 is as follows.

[Relation formula 1]

$$F=177.93131+(-71.22543)*(1-\exp(-H/0.01068))+(-106.32694)*(1-\exp(-H/0.60695))$$

The insulation of the overlay part can be evaluated by measuring the thickness of the pure insulation coating layer and substituting the measured thickness into the relation formula 1.

DESCRIPTION OF REFERENCE NUMERALS

11: current collector
12: electrode mixture layer
13: insulation coating layer
13*a*: insulation coating layer of overlay part
13*b*: pure insulation coating layer
S: insulation coating liquid

The invention claimed is:

1. A method for evaluating insulation of an overlay part in an electrode for evaluation wherein an insulation coating layer has been laminated on an inclined portion of an electrode mixture layer, wherein the electrode mixture layer is formed on an electrode current collector, wherein the inclined portion of the electrode mixture layer formed on the electrode mixture layer at an end of the electrode mixture layer having a gradually decreasing thickness, and wherein the overlay part is a portion of the insulation coating layer on the inclined portion of the electrode mixture layer, the method comprising:

applying and drying an insulation coating liquid on a flat upper surface of a simulated electrode mixture layer to form a simulated overlay part, and collecting first data about a first length of a first gap between a first applicator applying the insulation coating liquid and the flat upper surface of the simulated electrode mixture, a first thickness which has been increased by applying and drying the insulation coating liquid on the simulated electrode mixture layer of the simulated overlay part, and a capacity of the simulated overlay part;

applying and drying the insulation coating liquid on flat upper surface of a current collector to form a simulated pure insulation coating layer, and collecting second data about a second length of a second gap between a second applicator that applies the insulation coating liquid and the flat upper surface of the current collector, and a second thickness of the pure insulation coating layer on the current collector;

generating a first relation between the second thickness of the simulated pure insulation coating layer and the capacity of the simulated overlay part based on the first data and the second data;

measuring a thickness of a pure insulation coating layer of the electrode for evaluation; and determining a capacity of an overlay part of the electrode for evaluation from the measured thickness of the pure insulation coating layer of the electrode for evaluation using the generated relation, wherein the generating the first relation comprises:

deriving a second relation between the first thickness and the capacity of the simulated overlay part based on the first data about the capacity of the simulated overlay part according to the first thickness;

deriving a third relation between the first thickness and the second thickness based on the first data about the first length and the first thickness, and the second data about the second length and the second thickness; and deriving the first relation between the second thickness of the simulated pure insulation coating layer and the capacity of the simulated overlay part by combination of the second relation and the third relation, wherein the combination of the second relation and the third relation includes eliminating the first thickness to derive the first relation.

2. The method of claim 1, wherein the applying and drying of the insulation coating liquid on the simulated electrode mixture layer of the simulated overlay part comprises:

applying and drying the insulation coating liquid on the simulated electrode mixture layer of the simulated overlay part, and measuring the first length of the first gap of the applicator which applies the insulation coating liquid;

measuring the first thickness; and measuring the capacity of the simulated overlay part, wherein first data about the length of the first gap of the first applicator, the first thickness, and the capacity of the simulated overlay part is collected by repeating the applying and drying the insulation coating liquid, the measuring the first thickness, and the measuring the capacity.

3. The method of claim 1, wherein the applying and drying the insulation coating liquid on the current collector comprises:

applying and drying the insulation coating liquid on the current collector for the simulated pure insulation coating layer, and measuring the second length of the second gap of the second applicator; and measuring the second thickness of the simulated pure insulation coating layer, wherein second data about the second length, and the second thickness is collected by repeating the applying and drying the insulation coating liquid on the current collector for the simulated pure insulation coating layer and the measuring of the second thickness.

4. The method of claim 1, wherein the deriving the third relation comprises:

deriving a fourth relation between the first length of the first gap of the first applicator and the first thickness based on the first data;

deriving a fifth relation between the second length of the second gap of the second applicator and the second thickness based on the second data; and deriving the third relation by eliminating a gap of the applicator, and using the fourth relation and fifth relation.

5. The method of claim 2, wherein the measuring the capacity of the simulated overlay part includes manufacturing a coin cell including the simulated overlay part, and measuring the capacity of the simulated overlay part by measuring a charge capacity or a discharge capacity of the coin cell.

6. The method of claim 5, wherein the coin cell is a half cell.

7. The method of claim 1, wherein a part of the insulation coating liquid is permeated into the simulated electrode mixture layer during the applying and drying of the insulation coating liquid on the simulated electrode mixture layer of the simulated overlay part.

8. The method of claim 1, wherein the first thickness is obtained by subtracting a thickness of the simulated electrode mixture layer before application of the insulation coating liquid from a total thickness of the simulated electrode mixture layer and the insulation coating layer thereon after drying the insulation coating liquid.

9. The method of claim 1, wherein the insulation coating layer includes polyvinylidene fluoride (PVDF).

10. The method of claim 1, wherein the electrode is a positive electrode.

11. The method of claim 1, wherein the thickness of the pure insulation coating layer of the electrode for evaluation is equal to or less than 15 μm.

* * * * *